United States Patent Office 3,304,804
Patented Feb. 21, 1967

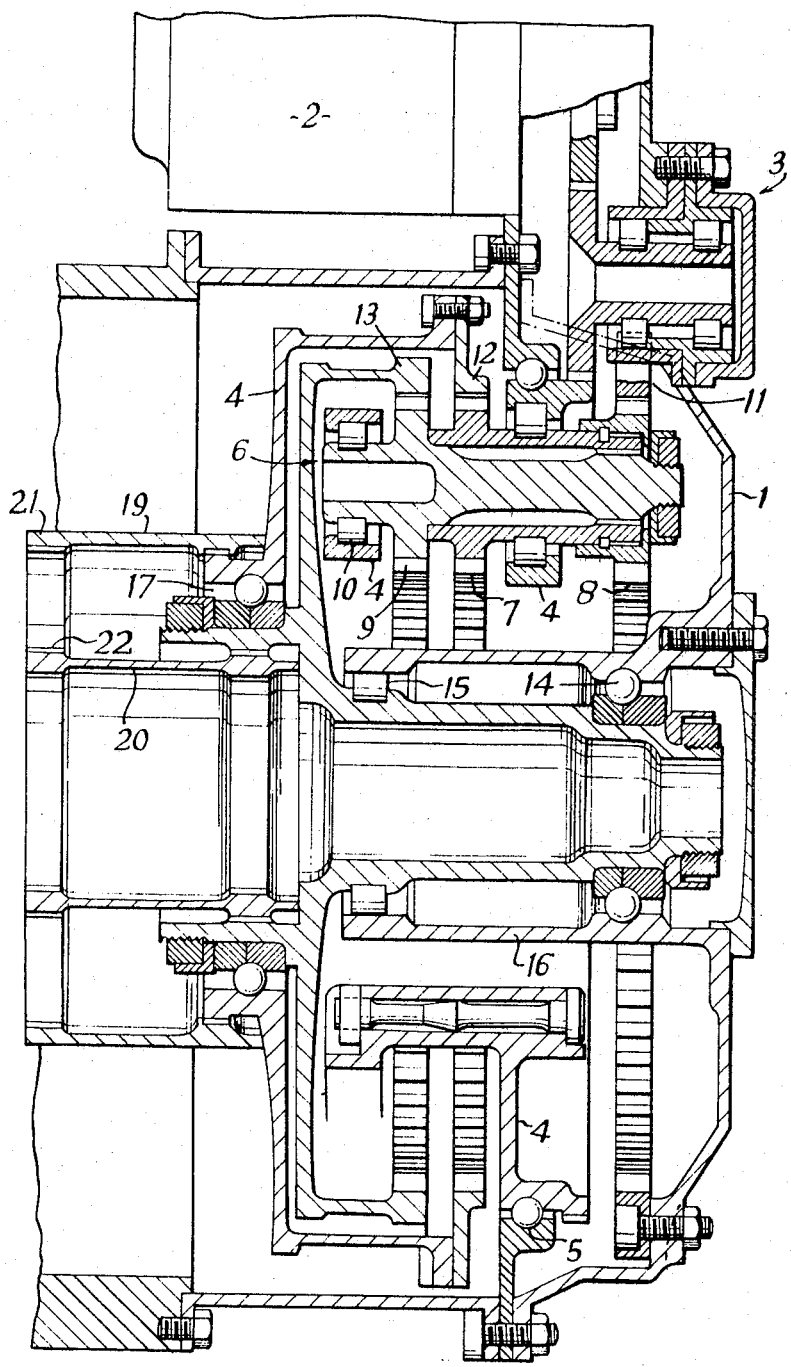

3,304,804
MECHANICAL ACTUATORS
Thomas A. Oldfield, Warsash, and Leonard T. Tribe, Waltham Chase, near Southampton, England, assignors to Plessey-UK Limited, Ilford, England, a British company
Filed Jan. 11, 1965, Ser. No. 424,767
Claims priority, application Great Britain, Jan. 10, 1964, 1,139/64
2 Claims. (Cl. 74—665)

This invention relates to mechanical actuators and has for an object to provide an improved mechanical actuator adapted to rotate two coaxial shafts simultaneously at equal speeds in opposite direction against equal reaction torques. The invention is more particularly intended for the operation of so-called eyelid flaps in thrust reversers for aircraft propulsion jet engines, and the combination of the actuator with such thrust reversers also forms an aspect of the invention. In order to reverse the thrust of a jet propulsion unit, so-called eye-lid flaps are normally used which are tiltable about an axis transverse to the axis of the jet, the reverser comprising two flaps which in the thrust-reversal position respectively cover two complementary halves of the cross-section of the jet pipe, while when normal forward thrust is required, they are swung out in opposite directions to be accommodated at diametrically opposite sides of the jet pipe. Very considerable torque must be transmitted in order to ensure the movement of each flap from its inoperative concealed position to its operative position and vice versa, and it has hitherto been the practice to employ for the actuation of the two flaps or eyelids a rectilinear ram which is coupled to each eye-lid by a link, the two links respectively acting upon two cranks extending in opposite directions from their respective pivot axes of the two eyelids. This arrangement involved the transmission of very considerable longitudinal forces between the ram cylinder and the pivot bearings, and as a result the weight of the actuators was undesirably high.

According to the present invention the actuator comprises a differential gear drive having three coaxial gears which are coupled with each other by planet gear sets, each having three coaxial planet gears which are interconnected for common rotation about their axis and whose diameters differ by substantially equal amounts, and a planet-gear carrier which is rotatable about the common axis of the gears, and in which each planet-gear set is mounted for rotation about an axis parallel to the said common axis, the gears respectively co-operating with the largest and smallest planet gear of each set being respectively coupled coaxially with the two coaxial elements which are to be rotated in opposite directions, and the third gear being fixed against rotation, and the planet-gear carrier being driven by a motor. The drive from the two movable gears is transmitted to the two eye-lids or other elements to be actuated by coaxial shaft elements in such manner that the transmission is effected by pure torque. The accompanying drawing is a sectional elevation illustrating one embodiment of the invention, in which all three gears are of the internally toothed type and hereinafter referred to as annulus gears.

Referring now to the drawing, the illustrated device comprises a stationary frame or housing 1 to which a displacement-type air motor 2 and a reduction gear drive 3 co-operating with the motor 2 are attached. A planet-gear carrier 4 is rotatably mounted to this structure by means of a ball-bearing 5, and a plurality of planet-gear sets 6 each comprising three planet gears 7, 8 and 9 interconnected for common rotation, are rotatably supported in the planet carrier 4 by roller bearings 10. Only one planet-gear set 6 is shown in the drawing for the sake of clarity. Also fixed in the stationary housing 1 is an annulus gear 11 which meshes with planet gear 8, while two further annulus gears 12 and 13, respectively meshing with the two other planet gears 7 and 9, are rotatably supported in the housing, the annulus gear 13 being supported by ball and roller bearings 14 and 15 which are arranged in a bushing 16 extending from the housing member 1, while the annulus gear 12 is in its turn rotatably supported on the structure of annulus gear 13 by ball-bearings 17. One of the planet gears 7, 9, in the example illustrated planet gear 7, has a diameter which lies below that of the planet gear 8 that engages the fixed annulus 11, conveniently by the same amount by which the diameter of the other planet gear 9 lies above the diameter of the planet gear 8 so that when the three planet gears have gear teeth of equal pitch, gear 7 may have seventeen teeth, gear 8 eighteen teeth, and gear 9 nineteen teeth. The differences in diameters and tooth numbers between annulus gears 11, 12 and 13 are the same as those of planet gears 8, 7 and 9 respectively, that is to say annulus gear 12 will have one tooth less, and annulus gear 13 one tooth more than annulus gear 11. It will be obvious to those skilled in the art that, in view of the great number of teeth on each of the annulus gears, the rotary speeds at which the two movable annulus gears are driven in opposite directions are very nearly equal, and that in this manner a very high reduction ratio can be achieved between air motor 2 and the driven annulus gears 12 and 13. The latter are equipped with coaxially arranged coupling sleeves 19 and 20 respectively, which at their outer ends are respectively coupled by dogs 21 or 22 to the two eye-lid flaps (not shown) which co-operate with a common jet pipe.

What we claim is:
1. A mechanical actuator comprising three coaxial gears, two of which are rotatable and the third of which is fixed against rotation, a planet gear carrier, means for driving said planet gear carrier about the axis of said gears, three planet gears mounted on said carrier, co-operating respectively with said three gears, and interconnected for simultaneous rotation about a common axis which is parallel to the axis of said gears, and two coaxial driven elements coupled respectively to said two rotatable gears, the planet gear co-operating with the fixed gear having a diameter intermediate the diameters of the other two planet gears and differing respectively from said diameters by approximately equal amounts.
2. A mechanical actuator as claimed in claim 1 wherein said three coaxial gears are annulus gears.

References Cited by the Examiner
UNITED STATES PATENTS
2,192,881  3/1940  Bothezat _____ 74—803

DAVID J. WILLIAMOWSKY, Primary Examiner.
DON A. WAITE, Examiner.
M. H. FREEMAN, T. C. PERRY, Assistant Examiners.